United States Patent [19]
Birang

[11] Patent Number: 5,708,506
[45] Date of Patent: Jan. 13, 1998

[54] APPARATUS AND METHOD FOR DETECTING SURFACE ROUGHNESS IN A CHEMICAL POLISHING PAD CONDITIONING PROCESS

[75] Inventor: Manoocher Birang, Los Gatos, Calif.

[73] Assignee: Applied Materials, Inc., Santa Clara, Calif.

[21] Appl. No.: 497,960

[22] Filed: Jul. 3, 1995

[51] Int. Cl.[6] .................. G01B 11/30; G01B 11/24; B24B 49/00
[52] U.S. Cl. .................. 356/371; 356/376; 451/6
[58] Field of Search .................. 356/371, 244, 356/246, 355–358, 360, 369, 382, 446; 451/6, 7; 156/626, 636; 250/225

[56] References Cited

U.S. PATENT DOCUMENTS

| | | | |
|---|---|---|---|
| 4,353,650 | 10/1982 | Sommargren | 356/371 |
| 4,435,247 | 3/1984 | Basi et al. | 156/636 |
| 4,859,062 | 8/1989 | Thurn et al. | 356/371 |
| 4,953,982 | 9/1990 | Ebbing et al. | 356/357 |
| 5,081,051 | 1/1992 | Mattingly et al. | 437/10 |
| 5,216,843 | 6/1993 | Breivogel et al. | 51/131.1 |
| 5,246,198 | 9/1993 | Kurihara | 249/114 |
| 5,337,144 | 8/1994 | Strul et al. | 356/357 |
| 5,377,002 | 12/1994 | Malin et al. | 356/237 |
| 5,413,941 | 5/1995 | Koos et al. | 437/8 |
| 5,433,650 | 7/1995 | Winebarger | 451/6 |
| 5,433,651 | 7/1995 | Lustig et al. | 451/6 |
| 5,539,213 | 7/1996 | Meeks et al. | 250/559 |

OTHER PUBLICATIONS

"SIRA Develops Tester for Sandpaper," *Photonics Spectra*, Feb. 1995, p. 30.

*Primary Examiner*—Frank G. Font
*Assistant Examiner*—Michael P. Stafira
*Attorney, Agent, or Firm*—Fish & Richardson, P.C.

[57] ABSTRACT

An apparatus and method for determining the roughness of a polishing surface of a chemical mechanical polishing (CMP) pad employing a light source and associated optics for producing a light beam which impinges on the polishing surface of the polishing pad, and a light detector for detecting light emanating from the polishing surface as a result of the light beam impinging thereon. The light detector includes elements for outputting a signal representative of the light detected. In addition, there is a device for comparing the signal output by the light detector to a prescribed signal, where the prescribed signal corresponds to a signal produced by the light detector when the polishing surface of the pad has a desired roughness.

53 Claims, 5 Drawing Sheets

(PRIOR ART)

APPARATUS AND METHOD FOR DETECTING SURFACE ROUGHNESS IN A CHEMICAL POLISHING PAD CONDITIONING PROCESS

BACKGROUND

1. Technical Field:

This invention relates to the manufacture of semiconductor devices, and more particularly, to an apparatus and method for detecting the surface roughness of the polishing pad used in a chemical mechanical polishing (CMP) process.

2. Background Art:

In the process of fabricating modern semiconductor integrated circuits (ICs), it is necessary to form various material layers and structures over previously formed layers and structures. However, the prior formations often leave the top surface topography of an in-process wafer highly irregular, with bumps, areas of unequal elevation, troughs, trenches, and/or other surface irregularities. These irregularities cause problems when forming the next layer. For example, when printing a photolithographic pattern having small geometries over previously formed layers, a very shallow depth of focus is required. Accordingly, it becomes essential to have a flat and planar surface, otherwise, some parts of the pattern will be in focus and other parts will not. In addition, if the aforementioned irregularities are not leveled at each major processing step, the surface topography of the wafer can become even more irregular, causing more problems as the layers stack up during further processing. Depending on the die type and the size of the geometries involved, the aforementioned surface irregularities can lead to poor yield and device performance. Consequently, it is desirable to effect some type of planarization, or leveling, of the IC structures. In fact, most high density IC fabrication techniques make use of some method to form a planarized wafer surface at critical points in the manufacturing process.

One method for achieving the aforementioned semiconductor wafer planarization or topography removal is the chemical mechanical polishing (CMP) process. In general, the CMP process involves holding and/or rotating the wafer against a rotating polishing platen under a controlled pressure. The polishing platen is typically covered with a pad. This pad is used in conjunction with a chemical polishing slurry to polish, i.e. remove material from, the wafer. The surface of the pad which interfaces with the wafer is usually either an open cell foamed polyurethane (e.g. Rodel IC1000), or a sheet of polyurethane with a grooved surface (e.g. Rodel EX2000). In either case, this surface is relatively rough so as to assist in the polishing process.

After a period of time, the pad becomes glazed due to the interaction between its polishing surface and the wafer. The surface features responsible for giving the pad its rough texture are blunted and reduced in size, or collapse under the pressure. This results in a degradation of the pad's ability to remove material from the surface of a wafer. Accordingly, the pad has to be periodically conditioned to restore its rough surface texture to ensure repeatable material removal rates in the CMP process. Customarily, the pad is conditioned after processing each wafer.

Figure 1:
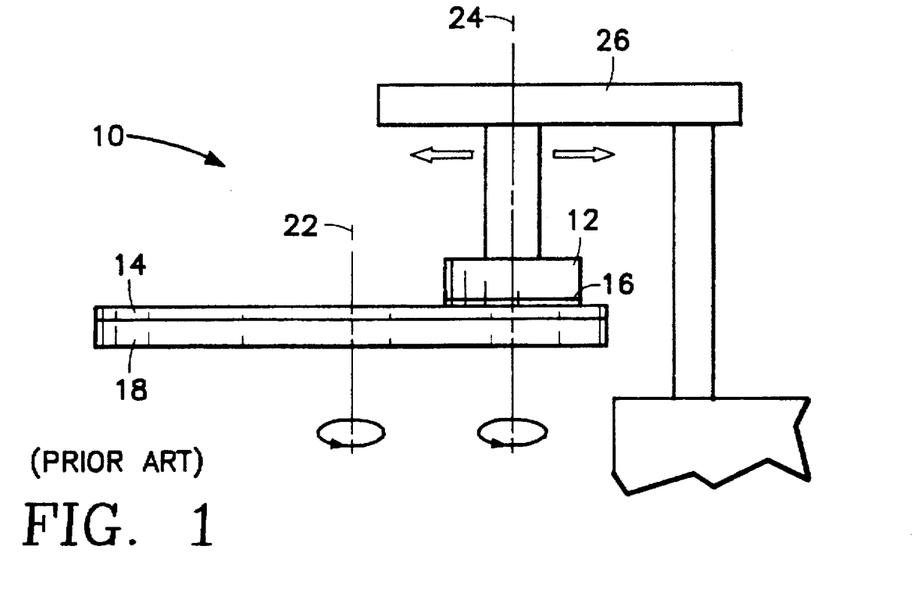
FIG. 1 is a side view of a CMP pad conditioning device typical of the prior art.

A typical apparatus used to condition a pad is shown in FIG. 1. The conditioning device 10 includes a conditioning head 12 which is held against the pad 14. The surface of the conditioning head 12 interfacing with the pad 14 is coated with a layer of diamond grit 16. The pad is supported by a platen 18. The pad material is typically wetted with an abrasive slurry to assist in the conditioning process. The platen 18 is usually rotated about its central axis 22. In addition, the conditioning head 12 is usually rotated about its central axis 24, and translated across the surface of the pad 14 via a translation arm 26.

It is noted that a new pad of either of the aforementioned types must be pre-conditioned before use in a CMP process. Pre-conditioning ensures an efficient wetting of the pad with an abrasive slurry employed in the CMP process. Essentially, this pre-conditioning entails performing the above-described pad conditioning process on the new pad.

A particular problem encountered during the conditioning of a CMP pad is in determining when the desired roughness has been restored to the pad. If the pad is conditioned too little, its efficiency will be less than expected, and if the pad is conditioned too long, pad material will be unnecessarily removed, thereby shortening its useful life. In the past, a trial and error method was used to determine the proper amount of conditioning time. However, due to the inaccuracies involved in the conditioning process, the same roughness cannot always be achieved by merely relying on time as a measure. Thus, the repeatability of the CMP process is adversely affected.

Accordingly, there is a need for a CMP pad conditioning apparatus and method which provide a more accurate determination of the roughness of the pad, in-situ, during the conditioning process, thereby assuring a consistent pad performance.

SUMMARY

The present invention is directed to a novel apparatus and method for detecting the roughness of a CMP pad surface, in situ, during processing, with an improved accuracy. The apparatus and method of the present invention employ the effects of a light beam directed at the surface of the CMP pad. A portion of the light beam so directed will be scattered and reflected by the rough surface of the pad. The various embodiments of the present invention make use of this light emanating from the pad's surface to determine its roughness.

Specifically, the foregoing objective is attained by an apparatus and method for determining the roughness of a polishing surface of a CMP polishing pad employing a light source and associated optics for producing a light beam which impinges the polishing surface of the polishing pad, and a light detector for detecting light emanating from the polishing surface. This light detector including elements for outputting a signal representative of the light detected. In addition, there is a device for comparing the signal output by the light detector to a prescribed signal, where the prescribed signal corresponds to the signal typically produced by the light detector when the polishing surface of the pad has the desired roughness.

In some embodiments according to the present invention, the light detector detects a portion of the light scattered from the polishing surface as a result of the impingement thereon by the light beam. A collector is used to collect and detect a portion of the scattered light. For example, a collecting lens might be used to focus a portion of the scattered light on a detector. In that case, it is preferred that the light beam be a broad spectrum collimated light beam having a diameter at the polishing surface of the pad which is equal to or greater than approximately 6 mm. Also, in these embodiments, the comparing device is used to compare the voltage of the signal output by the light detector to a prescribed voltage. This prescribed voltage corresponds to the voltage of the aforementioned prescribed signal. If the above-described device is employed in a conditioning apparatus used for performing a conditioning process on the polishing pad to produce a desired roughness on the polishing surface, the conditioning process is terminated whenever the voltage of the signal output by the light detector approximately equals the prescribed voltage.

In one principal embodiment of the invention, the light beam impinges on the polishing pad normal to the polishing surface. In this case, the light detector is placed at an angle to the surface of the pad where it will be illuminated by a portion of the scattered light which propagates from the polishing surface in all directions. However, in another embodiment, the light beam impinges on the polishing pad at an angle to the polishing surface. Preferably, this angle is within a range of approximately 40 to 50 degrees from normal. In this latter case, light is scattered from the polishing surface in a direction away from the source of the light beam and exhibits an intensity distribution pattern centered around the angle of incidence. In one version of this embodiment, the light detector detects light propagating through the central region within approximately 5 degrees of the angle of incidence of the light beam. In another version, the light detector detects light propagating outside this central region. And in yet another version, the light detector separately detects light both within and outside this central region. In the first two versions, the voltage of the signal from the light detector is compared to the prescribed voltage as discussed above. However, in the third version, the ratio of voltages is compared to a prescribed voltage ratio. The ratio of voltages is derived from the voltage corresponding to a first signal output by the light detector in response to detecting light propagating through the aforementioned central region and the voltage of a second signal output in response to detecting light propagating outside this region. The prescribed voltage ratio corresponds to a ratio of the voltages of the first and second signals typically output by the detector when the polishing surface of the pad has the desired roughness. In addition, if the just-described apparatus and method are employed in a device for performing a conditioning process on the polishing pad to produce a desired roughness on the polishing surface, the conditioning process is terminated whenever the ratio of voltages of the first and second signal output by the light detector approximately equals the prescribed voltage ratio.

In another principal embodiment according to the present invention, the light detector is used to detect at least a portion of the light reflected from the polishing surface as a result of the impingement thereon by the light beam. In this embodiment, it is preferred that the light beam produced is focused to as small a beam spot at the polishing surface as possible. In fact, a beam spot diameter at the polishing surface of less than 40 microns is most preferred. The comparison step is also different in this embodiment. Assuming, that the polishing pad is in motion relative to the light beam, the comparison step includes:

(a) measuring a predetermined number of discrete voltage values of the detector signal over a prescribed period of time;

(b) storing the measured voltage values to form an array;

(c) calculating the mean of the array;

(d) determining the average variation of the array from the calculated mean by dividing the summation of absolute value of the difference between the mean and each measured value of the array by the number of measured values; and, (e) comparing the average variation to a prescribed variance which corresponds to the average variation that is exhibited by the detector signal when the pad has the desired surface roughness.

If the just-described embodiment is used in a conditioning apparatus, the conditioning process is terminated whenever the comparing device indicates the average variation equals or exceeds the prescribed variance. In addition, if the pad being conditioned is the type having a grooved polishing surface, the aforementioned voltage values are measured only when the light beam overlies a non-grooved portion of the pad, and the prescribed period of time corresponds to one sweep of a conditioning head over the surface of the pad. The process is essentially the same if the pad being conditioned has no grooves, except that the measuring step is continuous for the duration of the conditioning head sweep, rather than periodic.

It is also desirable in all the previously described embodiments of the present invention to disperse the slurry used to wet the polishing surface of the pad in the areas impinged by the light beam to prevent attenuation of the beam. Accordingly, a gas source and device for directing the gas can be employed to direct gas at areas of the polishing pad impinged upon by the light beam. The gas is provided at a rate sufficient to displace the slurry from these areas. Preferably, the gas is helium, and the directing device includes a tube positioned over the polishing surface such that the gas impinges the surface in an essentially normal direction. In addition, in some embodiments, the light beam, and the light reflected from the polishing surface where applicable, are directed uninterrupted through the interior of the tube.

In addition to the just described benefits, other objectives and advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

FIGS. 8A and 8B are simplified illustrations of intensity distribution patterns emanating from the surface of the CMP pad in response to the impingement of a light beam at a angle to the surface. FIG. 8A shows the intensity distribution from a CMP pad having a relatively smooth surface and FIG. 8B shows the intensity distribution from a CMP pad having a much rougher surface.

DETAILED DESCRIPTION OF THE PREFERRED EMBODIMENTS

Preferred embodiments of the present invention will now be described with reference to the drawings.

Figure 2:
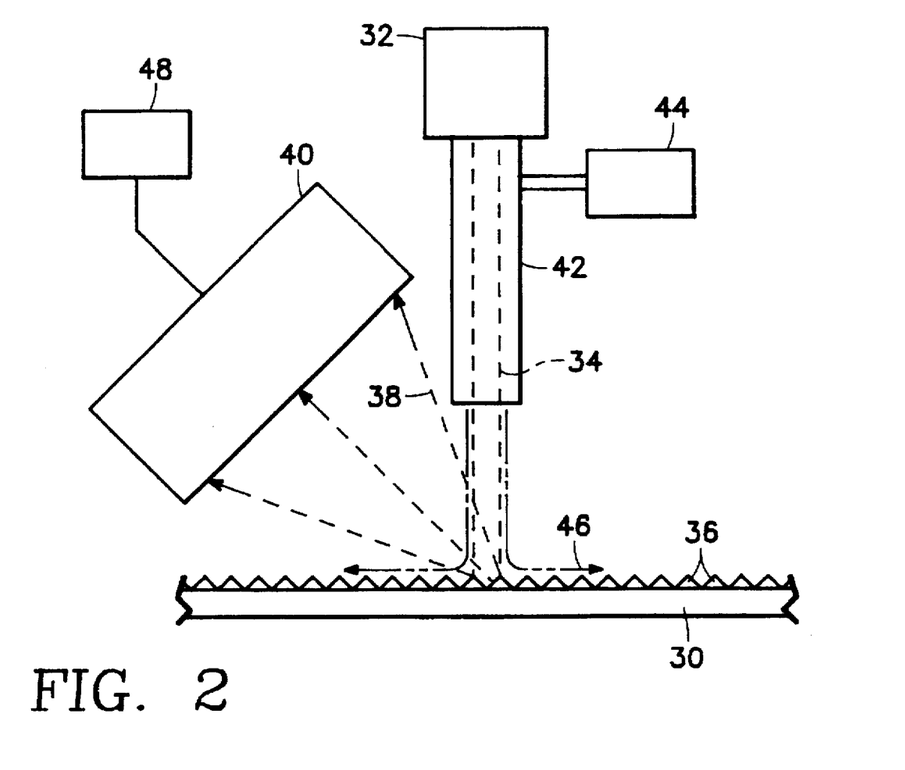
FIG. 2 is a simplified illustration of one embodiment of an apparatus for detecting the surface roughness of the CMP pad in accordance with the present invention, wherein the embodiment makes use of scattered light.

FIG. 2 depicts a first embodiment of the present invention which uses light scattered from the surface of the CMP pad 30 in response to the impingement of a collimated light beam 34, to determine its roughness. For the purposes of the following description, scattered light is defined as light emanating from the surface of the pad 30 at angles in the range of about 0 to 60 degrees from normal. The scattered light would, therefore, include reflected light, i.e. light emanating from the surface at approximately the angle of incidence of the impinging light beam 34. A light source and associated optics apparatus 32 is used to produce the collimated light beam 34. The beam 34 is shown as being directed normal to the surface of the pad 30 in FIG. 2. However, it is not intended that the first embodiment be limited to this beam orientation. The beam 34 could also be offset from normal, thus stalking the pad surface at an angle, if desired.

The beam 34 preferably has broad beam width on the order of 6 mm or more. The features 36 on the surface of the pad 30, which provide its rough texture, scatter part of the light impinging thereon. A broad beam width is preferred because it is desirable to illuminate a large number of features 36, rather than just a few. This results in the intensity of the scattered light being spatially integrated over the illuminated area of the pad 30. Accordingly, the impact of an individual feature 36, which might vary in size considerably from other features, is reduced, and the intensity of the scattered light 38 represents more of an average feature size within the illuminated area. Thus, a better indication of the overall roughness of the pad 30 can be obtained. In addition, it is preferable that a wide spectrum light source be employed, such as a white light or a broad band LED. Wide spectrum sources are preferred because a broad band light beam produces a more uniform pattern of scattered light from a rough surface, than does a more monochromatic source such as a laser. Since the scattered light is to be used to determine the surface roughness of the pad, the wide spectrum source is a better choice.

Figure 3:
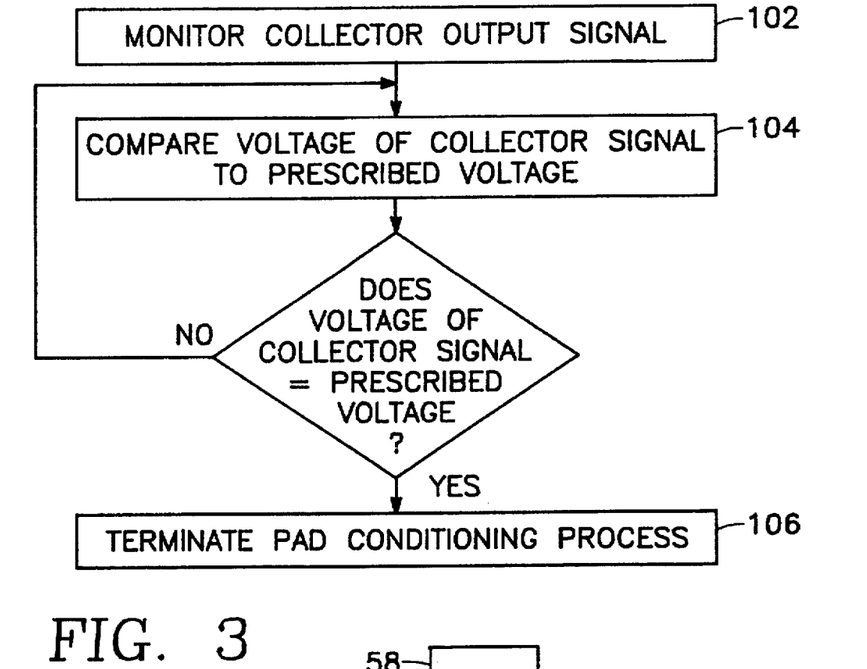
FIG. 3 is a block diagram of a method for detecting the surface roughness of the CMP pad in accordance with the present invention.

In order to determine the roughness of the pad surface from the scattered light, a portion of the scattered light 38 is made incident on a collector 40. This collector 40 generates a signal indicating the intensity of scattered light 38 detected. The roughness of the surface will for the most part determine the intensity of light scattered. Consequently, the voltage of the collector signal will be proportional to the surface roughness. This phenomenon allows the use of a processor 48 to determine when the pad has been conditioned to the desired roughness. As illustrated in FIG. 3, the first step 102 of the roughness determination process entails monitoring the collector output signal. The voltage of the collector signal is continuously compared to a prescribed voltage in step 104. This prescribed voltage corresponds to the voltage that would be output if the pad surface had the desired roughness. The prescribed voltage can be easily determined using a test pad having the desired roughness and measuring the voltage output from the collector 40. For example, a pre-conditioned new pad (as described previously) might be used as a test specimen to determine the prescribed voltage. It is noted that using the aforementioned broad beam width ensures that one illuminated area on the pad will produce a detector signal voltage which is essentially the same as any other area on the pad, assuming of course that the pad is being uniformly Conditioned. In a final step 106, when the voltage of the collector signal approximately equals the prescribed voltage, thus indicating the desired surface roughness has been obtained, the conditioning process is terminated.

One preferred light source and associated optics apparatus 32 is fully described in U.S. Pat. No. 5,337,144, the disclosure of which is hereby incorporated by reference. This same patent also includes preferred versions of the collector 40. Although, the aforementioned patent states that the light source can conveniently be a laser, as discussed above a wider spectrum source is preferred for the present embodiment of the invention. It is also noted that the collector, as described in the patent, can be any of the disclosed embodiments, each of which generally includes elements for collecting a portion of the scattered light and causing the collected light to be incident on an optical detector.

As discussed previously, the CMP pad is wetted with a slurry during the conditioning process. This slurry will tend to attenuate the light beam 34, and the scattered light 38 which must pass through it. The attenuation can weaken or distort the signal produced by the collector 40 to the point that the roughness of the pad 30 cannot be determined with any accuracy. To prevent the slurry from interfering with the roughness determination process, it is desirable to clear the slurry away from the area of the pad where the laser beam impinges. This is accomplished with the use of a tube 42 which is disposed over the pad 30. The tube 42 is connected to a gas source 44 which forces a gas 46 into the interior of the tube 42 and out the end overlying the pad 30. The gas 46 is forced through the tube 42 at a rate which will displace any slurry on the pad 30 in the area then below the tube 42. Preferably, this gas 46 is helium. The light source and associated optics apparatus 32 is disposed above the tube 42 and situated so that the light beam 34 is directed through approximately the center of the tube 42. Accordingly, the tube 42 has a diameter large enough to allow the light beam 34 to pass uninterrupted throughout its length.

Figure 4:
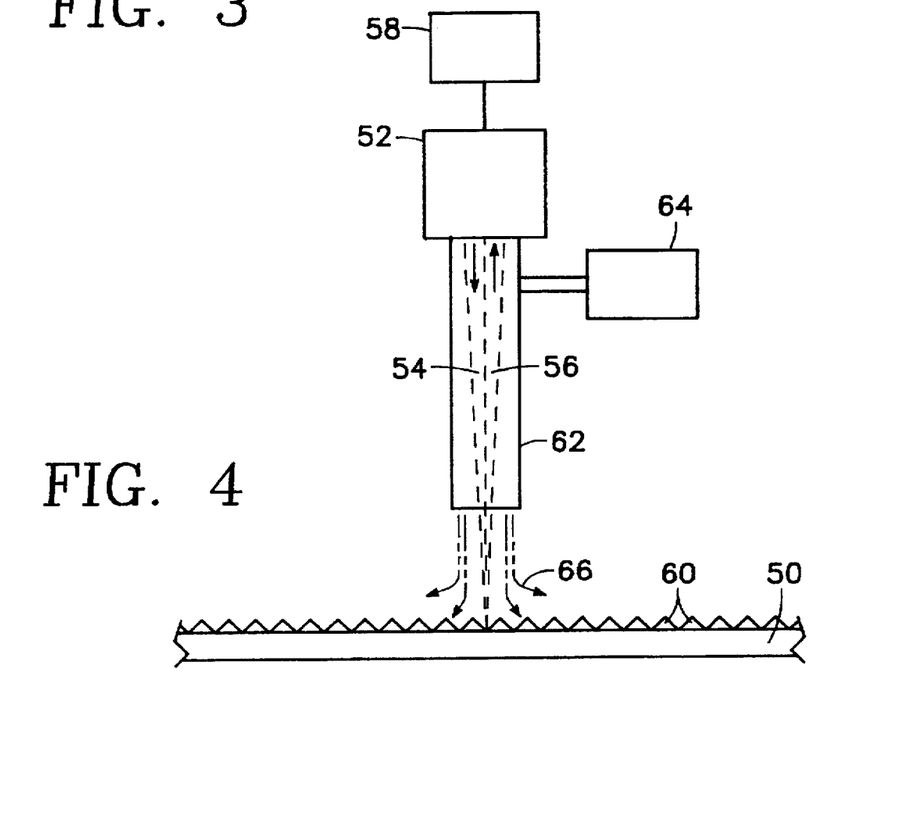
FIG. 4 is a simplified illustration of an alternate embodiment of the apparatus for detecting the surface roughness of the pad in accordance with the present invention, which employs reflected light instead.

FIG. 4 depicts a second embodiment of the present invention which employs only the reflected portion of the light emanating from the surface of the CMP pad 50 (i.e. the light emanating from the surface at approximately the angle of incidence of the impinging light beam 54) to determine the pad's roughness. This second embodiment employs a light source and detector apparatus 52 which produces a focused light beam 54 and detects a portion of the light 56 reflected from the surface. The preferred light source and detector apparatus 52 is fully described in U.S. Pat. No. 4,953,982, the disclosure of which is hereby incorporated by reference. The preferred light source and detector 52 correspond to the laser, optical components, and detector described by the aforementioned patent in connection with its endpoint detection system. However, instead of the signal from the detector being used to determine an etching process endpoint, it is used to determine the roughness of the pad 50.

Figure 5A:
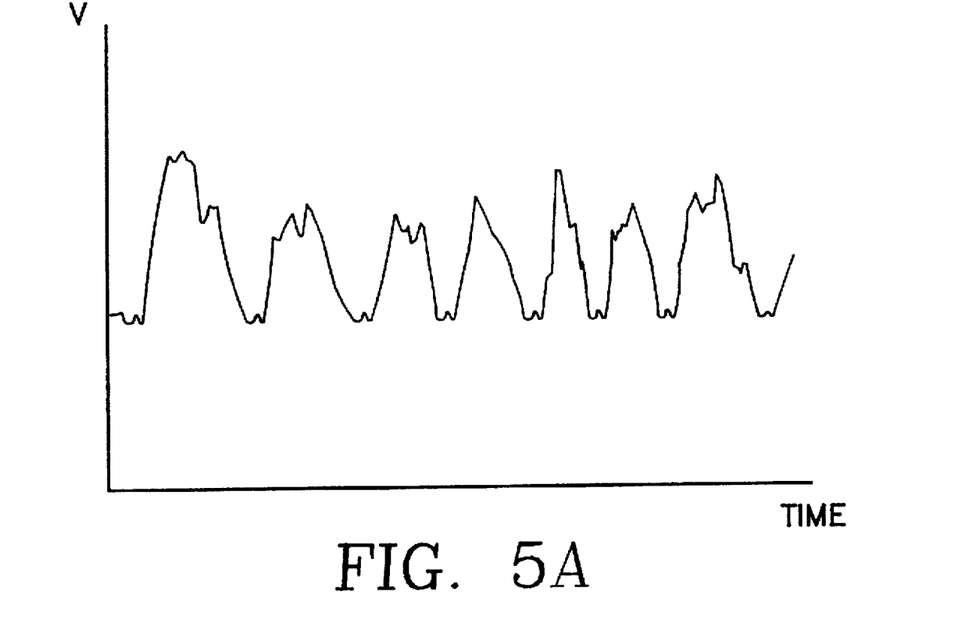
FIGS. 5A and 5B are graphs representing the signal output by a light detector of the embodiment of FIG. 4, wherein FIG. 5A exemplifies the signal when the surface roughness of a grooved-type CMP pad is being detected and FIG. 5B exemplifies the signal when the surface roughness of a non-grooved CMP pad is being detected.

FIG. 5A exemplifies the waveform of the signal output from the light source and detector apparatus 52 when the pad 50 is illuminated with the light beam 54. The pad 50 being conditioned to produce the signal depicted in FIG. 5A is the grooved type described previously. The relatively large periodic dips or valleys in the signal are indicative of the periods where the light beam is illuminating one of the grooves in the pad surface. The large periodic peaks in the signal represent the higher surface regions of the pad 50 lying between the grooves. It is the features 60 on these higher surface regions of the pad 50 which are of interest and which contribute to the polishing action during a CMP process. The smaller peaks and valleys depicted on the upper portions of the aforementioned large peaks are caused by the fine, local features of the pad 50 between the grooves. These smaller peaks and valleys in the signal can be used to provide an indication of the roughness of the pad 50. This is done via the method illustrated in FIG. 6. In accordance with step 202, a processor 58 (shown in FIG. 4) measures a series of discrete voltage values X of the detector signal whenever the signal exhibits an aforementioned large peak during one sweep of the conditioning head across the surface of the pad 50. It is noted that the large peaks in the signal can be detected by the processor via well known signal processing methods, such as those employing slope changes as an indicator. As peak detecting methods are known, no further details will be provided herein.

A sweep of the conditioning head refers to its translation from the outside edge of the pad 50 to its center, or vice versa. Data is taken for an entire sweep of the conditioning head to ensure that the pad has a substantially uniform roughness across its surface before the conditioning process is terminated (as will be explained later). The number n of values X measured is preferably chosen to ensure that an accurate representation of the detector signal is captured. It has been found in a tested embodiment of the present invention that a sample rate of one value X every 100 milliseconds was sufficient to provide the desired representational accuracy at a head translation speed of 0.1 inches per second. The measured values are stored in an array $X_i$, as illustrated by step 204. Then, in step 206, the mean $\overline{X}$ of the array $X_i$ is calculated as follows:

$$\overline{X} = \frac{\sum_{i=0}^{n} X_i}{n} \quad (1)$$

In the next step 208, the average variation V of the measured values X forming the array $X_i$, from the calculated mean $\overline{X}$, is determined. This is preferably accomplished by the processor 58 using the following algorithm:

$$V = \frac{\sum_{i=0}^{n} |\overline{X} - X_i|}{n} \quad (2)$$

Figure 6:
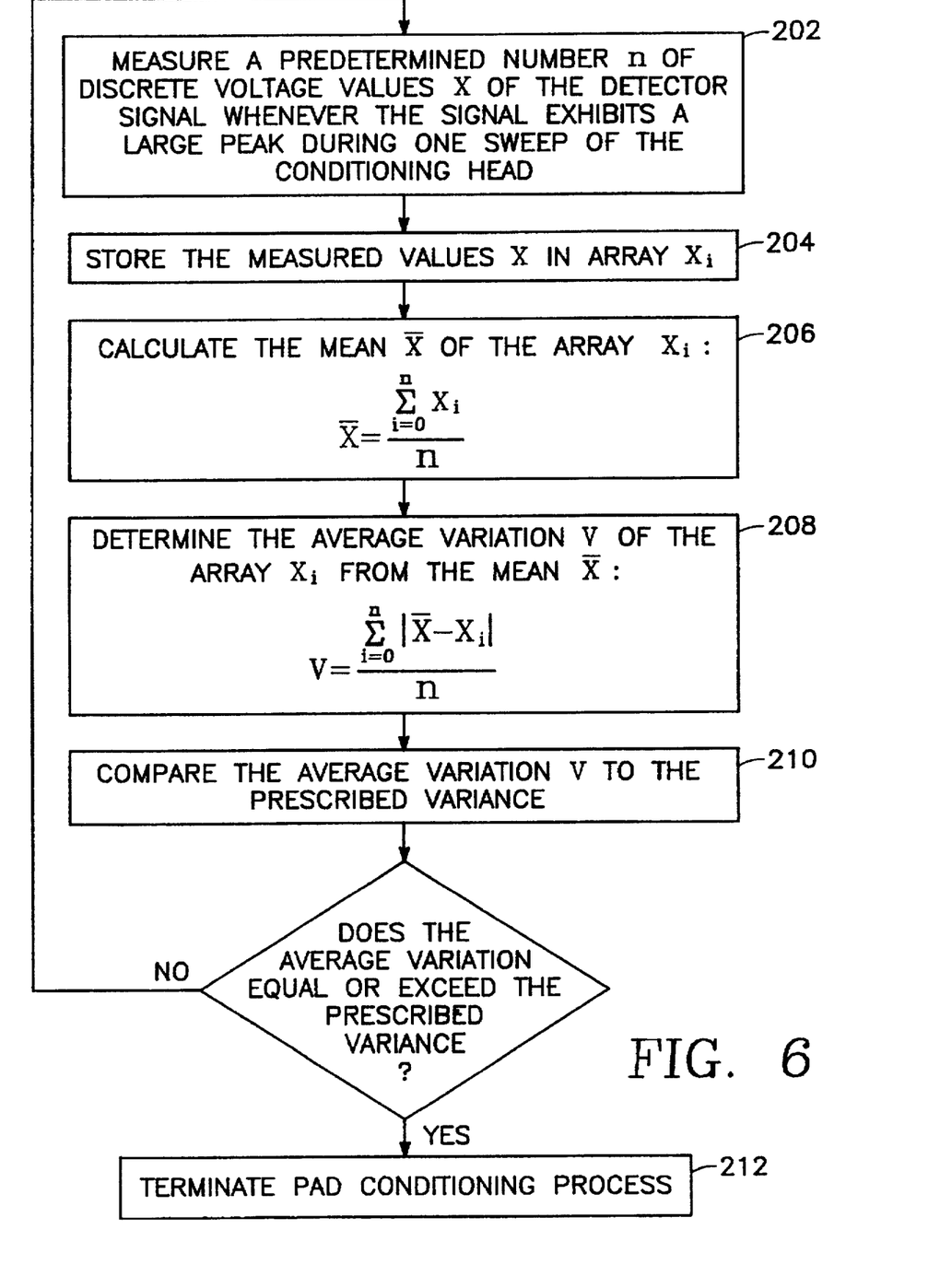
FIG. 6 is a block diagram of a method for detecting the surface roughness of the CMP pad using the apparatus of FIG. 4.

The roughness of the pad surface is proportional to this average variation V in that the larger the variation, the rougher the surface. Thus, in step 210, the average variation V is compared to a prescribed variance which corresponds to the desired surface roughness. If the average variation V equals or exceeds the prescribed variance, the desired roughness has been obtained and the pad conditioning is terminated, as shown in step 212. If not, then the roughness determination process (steps 202 through 210) is repeated. The prescribed variance can be easily determined by employing a pre-conditioned new pad (as described previously) of the appropriate type as a test specimen, and calculating the above-described average variation V.

Figure 5B:
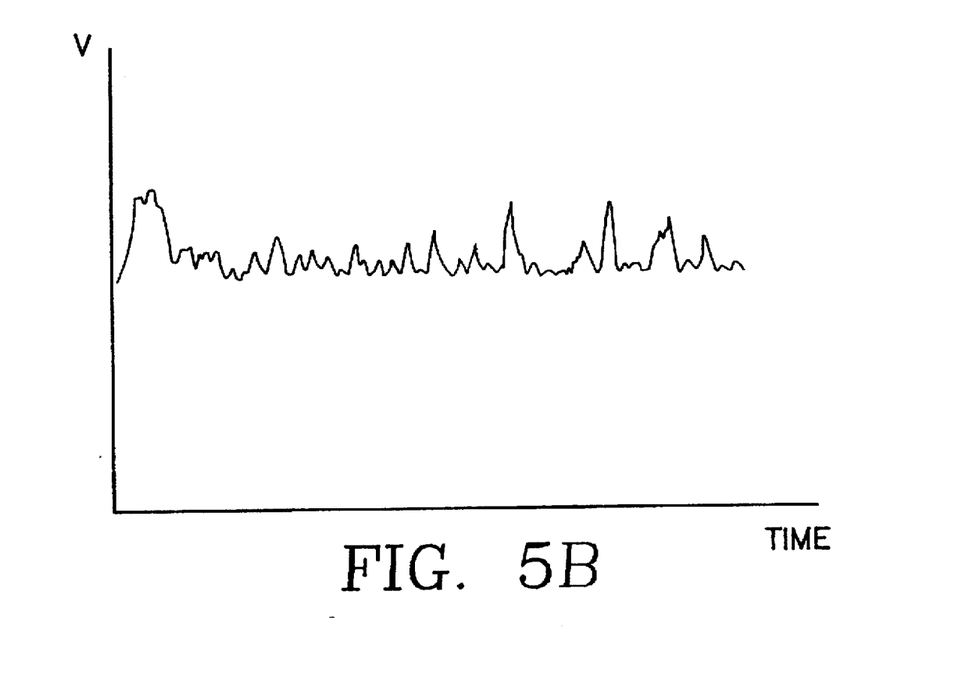

In contrast to the waveform shown in FIG. 5A, it is believed the signal output from the light source and detector apparatus 52 during the conditioning of a non-grooved pad 50, such as an open cell foamed polyurethane pad, would appear as shown in FIG. 5B. As can be seen, the larger valleys corresponding to the grooves are not present. The process for determining the roughness of the pad surface for a non-grooved pad is identical to that of a grooved pad, with the exception that the voltage values X are measured continuously during the sweep of the conditioning head, instead of periodically when a large peak is present.

The light source and detector apparatus 52 preferably produces a tightly focused light beam 56. It has been found that the size of the features 60 that are represented by the smaller peaks and valleys in the signal depicted in FIG. 5A, closely relate to the size of the light beam's diameter at the surface of the pad. Namely, the smaller peaks and valleys correspond to feature sizes approximately equal to or larger than the beam spot diameter. Accordingly, to ensure that the aforementioned average variation of the signal provides an accurate portrayal of the pad's surface roughness, the beam spot should be a small as possible. Typical features sizes on a CMP pad can range from as little as 5 μm, to hundreds of microns. Thus, a spot size of approximately 5 μm would be ideal as all the differently sized features 60 would be represented in the detector signal. Of course, a device which could produce such a tightly focused beam may be too expensive and impractical to employ. A larger diameter beam spot will still provide a reasonably accurate representation of the surface roughness. The preferred light source and detector apparatus 52 described in U.S. Pat. No. 4,953, 982, produces a beam spot with less than a 40 μm diameter. It has been found that this beam size produces a acceptably accurate representation of the surface roughness of the pad 50.

As with the first embodiment, the slurry used to wet the pad 50 during conditioning will tend to attenuate the light beam 54 and the reflected light 56. To prevent this attenuation, the previously described process of clearing the slurry away from the area of the pad 50 then being illuminated by the light beam 54, is employed in the second embodiment as well. As shown in FIG. 4, the tube 62 is disposed over the pad 50. The gas source 64 connected to the tube 62 forces gas 66 into the interior of the tube 62 and out the end overlying the pad 50. The gas displaces the slurry and prevents the aforementioned attenuation. Here again, the preferred gas 66 is helium. The light source and detector apparatus 52 is disposed above the tube 62 and situated so that the light beam 54 and reflected light 56 pass uninterrupted through the tube 62. The diameter of the tube is made large enough to accommodate the beams 54, 56.

Figure 7:
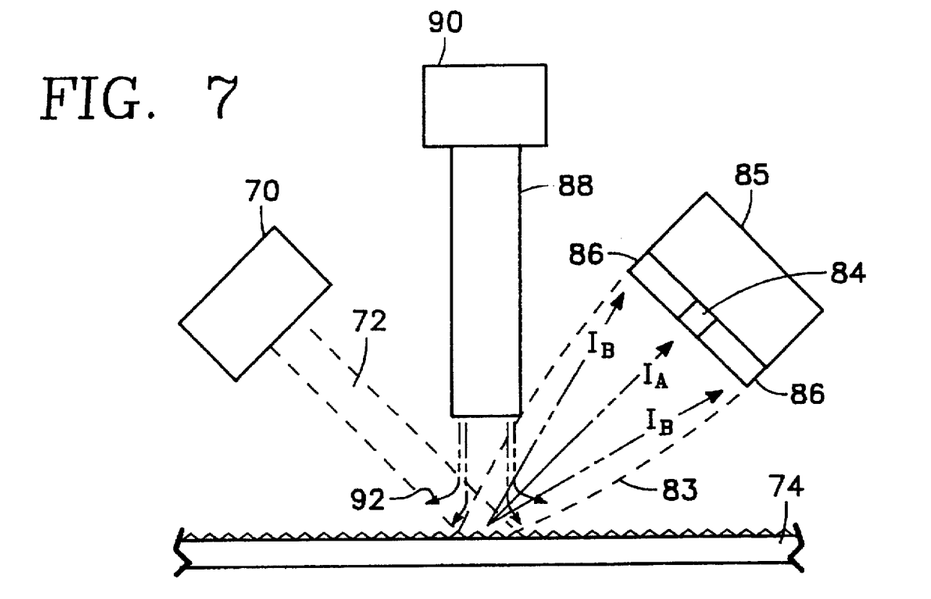
FIG. 7 is a simplified illustration of yet another embodiment of an apparatus for detecting the surface roughness of the pad in accordance with the present invention, employing a light beam impinging the CMP pad at an angle and detecting scattered light therefrom.

FIG. 7 depicts a third embodiment of the present invention. This embodiment employs a light source and associated optics apparatus 70 which is essentially the same as that used in the first described embodiment. However, in this embodiment, the intensity distribution of the light scattered from the surface of the pad 74 is employed to determine the pad's roughness.

Figure 8A:
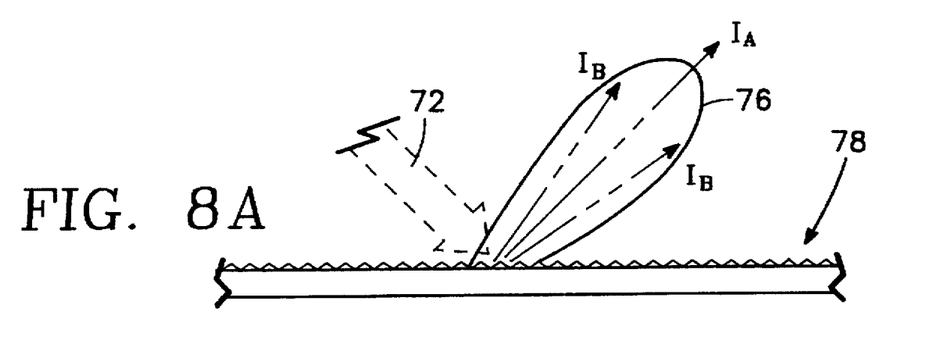
Figure 8B:
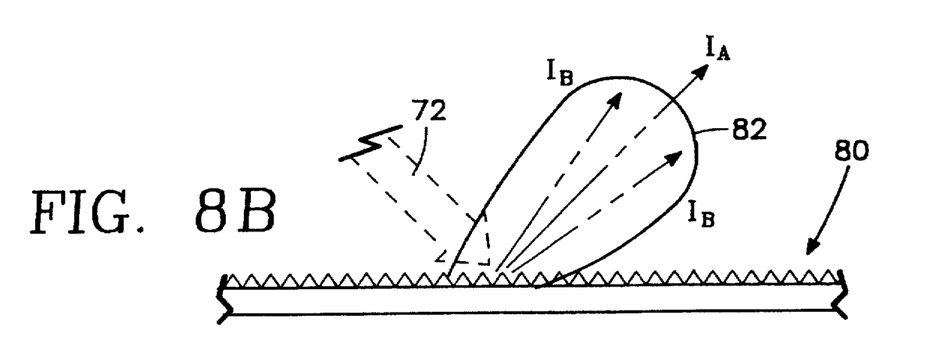

As shown in FIG. 7, the light source and associated optics apparatus 70 is oriented such that the light beam 72 strikes the polishing surface of the pad 74 at a angle, preferably within a range of 40 to 50 degrees from normal. The intensity distribution of the light emanating from the surface of the pad 74 will vary depending on the roughness of the pad's surface. For instance, as shown in FIG. 8A, a slightly roughened surface 78 will produce a tight distribution 76 where the components ($I_A$), centered within the distribution 76 near the angle mirrored about the normal from the angle of incidence of the light beam 72, are relatively more intense than components ($I_B$) directed along the outer boundaries of the distribution 76. For the purposes of this description, the $I_A$ components of the distribution 76 are defined as those components directed within approximately 5 degrees of the angle of incidence, whereas $I_B$ components are those directed outside this range. However, the intensity distribution changes as the surface get rougher. As shown in FIG. 8B, a rougher surface 80 produces an intensity distribution 82 where the $I_A$ component is less intense and the $I_B$ components are more intense, than in the case of a smoother surface such as depicted in FIG. 8A.

Referring again to FIG. 7, the above-described phenomenon is exploited to determine the roughness of the surface of the pad 74. One way of accomplishing this is to place a light detector 84 in a position where it will be illuminated exclusively by the $I_A$ components of the light 83 emanating from the surface of the pad 74. The voltage of the signal output by this detector 84 is monitored by a processor 85. The processor 85 compares the monitored voltage to a prescribed voltage which corresponds to the voltage of a signal output by the detector 84 when the surface of the pad 74 has the desired roughness. In the case where the pad 74 is being conditioned, the conditioning process would be terminated when the monitored voltage decreases (i.e. because $I_A$ decreases as the surface get rougher during the conditioning process) to a point where it is equal the prescribed voltage. As can be inferred from the above description, the roughness determination process is essentially the same as that illustrated in FIG. 3 in conjunction with the first described embodiment of the invention. Alternately, the roughness of the pad's surface can be determined by monitoring the $I_B$ components of the light 83 emanating from the pad 74, or a portion thereof. This is accomplished by placing a light detector 86 exclusively in the region associated with the $I_B$ components of the light 83. Here again, the processor 85 compares the monitored voltage to a prescribed voltage which corresponds to the voltage of a signal output by the alternate detector 86 when the surface of the pad 74 has the desired roughness. In the case where the pad 74 is being conditioned, the conditioning process would be terminated when the monitored voltage increases (i.e. because $I_B$ increases as the surface get rougher during the conditioning process) to a point where it is equal the prescribed voltage.

In yet a third way of determining the surface roughness, both of the aforementioned detectors 84, 86 could be employed. In this latter case, the voltage of each detector 84, 86 would be monitored by the processor 85 and the ratio of the two output voltages (i.e. either $I_A/I_B$ or $I_B/I_A$) compared to a prescribed voltage ratio which corresponds to the appropriate voltage ratio produced when the surface is at the desired roughness. In the case of a pad conditioning process, the process is terminated when the monitored voltage ratio equals the prescribed ratio. Thus, the roughness determination process is again essentially the same as that illustrated in FIG. 3, except that a voltage ratio is employed. This voltage ratio method has advantages in that the ratio of a decreasing signal and an increasing signal (or vice versa) has a greater rate of change than the voltage signal from either detector 84, 86 alone as the surface roughness changes. Accordingly, the signal-to-noise ratio of the roughness determination process would be better.

Although two separate light detectors 84, 86 are described above, alternately a single two-dimensional CCD array could be employed. In this case, the processor 85 would be used to monitor the array and distinguish between those elements of the array within the IA region and those elements within the $I_B$ region. The average voltage of the signals produced from the array elements in each of the aforementioned regions would be employed in the roughness determination process, which remains the same as described above.

It is also noted that, as with the first embodiment, it is preferred that a broad spectral light source having a beam width on the order of 6 mm or more be employed in the present embodiment because a more integrated and intense scattering of light is produced, than would be using a source such as a laser. Additionally, it is preferred that the previously described apparatus and method of dispersing the slurry from the areas of the pad illuminated by the light beam be employed in the third embodiment as well. Specifically, as shown in FIG. 7, the tube 88 is disposed over the pad 74. The gas source 90 connected to the tube 88 forces gas 92 into the interior of the tube 88 and out the end overlying the pad 74. However, since the light beam 72 strikes the surface of the pad 74 at an angle, and it is believed the slurry is most efficiently dispersed when the gas 92 is directed normal to the surface, the tube 88 is preferably positioned with its longitudinal axis perpendicular to the pad surface. Accordingly, the light beam 72 is not directed through the tube 88, as in previously described embodiments of the invention.

While the invention has been described in detail by reference to the preferred embodiment described above, it is understood that variations and modifications thereof may be made without departing from the true spirit and scope of the invention. For example, the disclosed apparatus and method for detecting pad roughness could be employed, in-situ, during the CMP process itself to ascertain the when the roughness of the pad drops below some predetermined value. The CMP process could then be terminated and the pad conditioned.

Wherefore, what is claimed is:

1. An apparatus for determining the roughness of a polishing surface of a polishing pad, comprising:

(a) a light source for producing a light beam which impinges the polishing surface of the polishing pad at a predetermined angle;

(b) a light detector for detecting light emanating from the polishing surface of the polishing pad resultant from said light beam, said light detector including an output for outputting a signal representative of the light detected; and (c) a processor coupled to the light detector and configured to determine the roughness of the polishing surface of the polishing pad from the signal output by the light detector.

2. The apparatus of claim 1, wherein the polishing surface of the polishing pad is wetted with a slurry, the apparatus further comprising:

a gas source;

means for directing gas from the gas source at areas of the polishing pad impinged upon by the light beam, said gas being directed at a rate sufficient to displace the slurry from the areas impinged upon by the light beam.

3. The apparatus of claim 2, wherein: the gas is helium.

4. The apparatus of claim 2, wherein the gas directing means comprises:

a tube positioned over the polishing surface such that the gas impinges the surface in an essentially normal direction.

5. The apparatus of claim 4, wherein:

the light beam is directed uninterrupted through the interior of the tube.

6. The apparatus of claim 4, wherein
(a) the light detector detects at least a portion of the light reflected from the polishing surface as a result of the impingement thereon by the light beam; and wherein,
(b) both the light beam and the light reflected from the polishing surface are directed uninterrupted through the interior of the tube.

7. An apparatus for determining the roughness of a polishing surface of a polishing pad, comprising:
(a) a light source for producing a light beam which impinges the polishing surface of the polishing pad at a predetermined angle;
(b) a light detector for detecting a portion of the light scattered from the polishing surface of the polishing pad as a result of the impingement thereon by the light beam, said light detector including an output for outputting a signal representative of the light detected; and
(c) a processor coupled to the light detector and configured to determine the roughness of the polishing surface of the polishing pad from the signal output by the light detector.

8. The apparatus of claim 7, wherein:
the light beam is a broad spectrum collimated light beam.

9. The apparatus of claim 7, wherein:
the light beam has a diameter at the polishing surface of the pad which is equal to or greater than approximately 6 mm.

10. The apparatus of claim 7 wherein the processor is configured to compare the signal output by the light detector to a prescribed signal, said prescribed signal corresponding to a signal produced by the light detector whenever the polishing surface of the pad exhibits a desired roughness.

11. The apparatus of claim 10, wherein the processor is configured to compare the voltage of the signal output by the light detector to a prescribed voltage, and the prescribed voltage corresponds to the voltage of the prescribed signal.

12. The apparatus of claim 11, wherein the apparatus is employed in a device for performing a conditioning process on the polishing pad to produce a desired roughness on the polishing surface, and the processor is configured to terminate the conditioning process whenever the voltage of the signal output by the light detector approximately equals the prescribed voltage.

13. The apparatus of claim 7, wherein:
the light beam impinges on the polishing pad normal to the polishing surface.

14. The apparatus of claim 7, wherein:
(a) the light beam impinges on the polishing pad at an angle to the polishing surface, said angle being within a range of approximately 40 to 50 degrees from normal; and,
(b) the light detector detects light propagating through a region within approximately 5 degrees of the angle of incidence of the light beam.

15. The apparatus of claim 7, wherein:
(a) the light beam impinges on the polishing pad at an angle to the polishing surface, said angle being within a range of approximately 40 to 50 degrees from normal; and,
(b) the light detector detects light propagating outside a region within approximately 5 degrees of the angle of incidence of the light beam.

16. The apparatus of claim 14, wherein:
the light detector further detects light propagating from the polishing surface outside said region.

17. The apparatus of claim 16 wherein the processor is configured to compare a ratio of voltages to a prescribed voltage ratio, and wherein the ratio of voltages comprises the voltage corresponding to a first signal output by the light detector in response to the detecting light propagating through the region within approximately 5 degrees of the angle of incidence of the light beam and the voltage of a second signal output in response to detecting light propagating outside said region, and wherein the prescribed voltage ratio corresponds to a ratio of the voltages of the first and second signals output by the light detector whenever the polishing surface of the pad exhibits the desired roughness.

18. The apparatus of claim 17, wherein the apparatus is employed in a device for performing a conditioning process on the polishing pad to produce a desired roughness on the polishing surface, and the processor is configured to terminate the conditioning process whenever the ratio of voltages of the first and second signal output by the light detector approximately equals the prescribed voltage ratio.

19. An apparatus for determining the roughness of a polishing surface of a polishing pad, comprising:
(a) a light source for producing a light beam which impinges the polishing surface of the polishing pad at a predetermined angle;
(b) a light detector for detecting at least a portion of the light reflected from the polishing surface of the polishing pad as a result of the impingement thereon by the light beam, said light detector including an output for outputting a signal representative of the light detected; and
(c) a processor coupled to the light detector and configured to determine the roughness of the polishing surface of the polishing pad from the signal output by the light detector.

20. The apparatus of claim 19, further comprising:
optics associated with the light source to produce a light beam having as small a beam spot at the polishing surface as possible.

21. The apparatus of claim 19, wherein:
the optics produce a light beam having a beam spot diameter at the polishing surface of less than 40 microns.

22. The apparatus of claim 19 wherein the processor is configured to compare the signal output by the light detector to a prescribed signal, said prescribed signal corresponding to a signal produced by the light detector whenever the polishing surface of the pad exhibits a desired roughness.

23. The apparatus of claim 22, wherein the polishing pad is in motion relative to the light beam, and wherein the processor comprises:
(a) means for measuring a predetermined number of discrete voltage values of the light detector signal over a prescribed time period;
(b) means for storing the voltage values to form an array;
(c) means for calculating the mean of the array;
(d) means for determining an average variation of the voltage values of the array from the mean of the array by dividing the summation of the absolute value of the difference between the mean of the array and each voltage value of the array by the predetermined number of values measured; and,
(e) means for comparing the average variation to a prescribed variance, said prescribed variance corresponding to the average variation that is exhibited by the light detector signal whenever the polishing pad has the desired surface roughness.

24. The apparatus of claim 23, wherein the apparatus is employed in a device for performing a conditioning process on the polishing pad to produce a desired roughness on the polishing surface, and the processor is configured to terminate the conditioning process whenever the average variation equals or exceeds the prescribed variance.

25. The apparatus of claim 23, wherein the apparatus is employed in a device for performing a conditioning process on the polishing pad to produce a desired roughness on the polishing surface, said device having a conditioning head which translates across the polishing surface of the pad and said polishing surface of the pad comprising a plurality of grooves, and wherein:
    (a) the measuring means measures voltage values of the light detector signal only when the light beam overlies a non-grooved portion of the polishing pad; and,
    (b) the prescribed period of time corresponds to one sweep of a conditioning head over the surface of the pad.

26. The apparatus of claim 23, wherein the apparatus is employed in a device for performing a conditioning process on the polishing pad to produce a desired roughness on the polishing surface, said device having a conditioning head which translates across the polishing surface of the pad and said polishing surface lacking grooves, and wherein:
    the prescribed period of time corresponds to one sweep of a conditioning head over the surface of the pad.

27. A method for determining the roughness of a polishing surface of a polishing pad, comprising the steps of:
    (a) producing a light beam which impinges the polishing surface of the polishing pad at a predetermined angle;
    (b) detecting light emanating from the polishing surface of the polishing pad resultant from said light beam;
    (c) outputting a signal representative of the light detected; and
    (d) determining the roughness of the polishing surface of the polishing pad from the signal output by the light detector.

28. The method of claim 27, wherein the polishing surface of the polishing pad is wetted with a slurry, the method further comprising the step of:
    directing a stream of gas at areas of the polishing pad impinged upon by the light beam, said stream of gas being directed at a rate sufficient to displace the slurry from the areas impinged upon by the light beam.

29. The method of claim 28, wherein the directing step comprises:
    directing the gas through a tube positioned over the polishing surface such that the gas impinges the surface in an essentially normal direction.

30. The method of claim 29, wherein the step of producing a light beam comprises:
    directing the light beam uninterrupted through the interior of the tube.

31. A method for determining the roughness of a polishing surface of a polishing pad, comprising the steps of:
    (a) producing a light beam which impinges the polishing surface of the polishing pad at a predetermined angle;
    (b) detecting a portion of the light scattered from the polishing surface of the polishing pad as a result of the impingement thereon by the light beam;
    (c) outputting an output signal representative of the light detected; and
    (d) determining the roughness of the polishing surface of the polishing pad from the output signal.

32. The method of claim 31, wherein the step of producing a light beam comprises:
    producing a broad spectrum collimated light beam.

33. The method of claim 31, wherein the step of producing a light beam comprises:
    producing a light beam having a diameter at the polishing surface of the pad which is equal to or greater than approximately 6 mm.

34. The method of claim 31, wherein the determining step comprises:
    comparing the output signal to a prescribed voltage, wherein the prescribed voltage corresponds to the voltage of the prescribed signal.

35. The method of claim 34, wherein the comparing step comprises:
    comparing the voltage of the output signal to a prescribed voltage, wherein the prescribed voltage corresponds to the voltage of the prescribed signal.

36. The method of claim 35, wherein the method is employed for performing a conditioning process on the polishing pad to produce a desired roughness on the polishing surface, the method further comprising the step of:
    terminating the conditioning process whenever the voltage of the output signal approximately equals the prescribed voltage.

37. The method of claim 31, wherein the step of producing the light beam comprises:
    directing the light beam so as to impinge on the polishing pad normal to the polishing surface.

38. The method of claim 31, wherein:
    (a) the step of producing the light beam comprises directing the light beam so as to impinge on the polishing pad at an angle to the polishing surface, said angle being within a range of approximately 40 to 50 degrees from normal; and,
    (b) the detecting step comprises detecting light propagating through a region within approximately 5 degrees of the angle of incidence of the light beam.

39. The method of claim 31, wherein:
    (a) the step of producing the light beam comprises directing the light beam so as to impinge on the polishing pad at an angle to the polishing surface, said angle being within a range of approximately 40 to 50 degrees from normal; and,
    (b) the detecting step comprises detected light propagating outside a region within approximately 5 degrees of the angle of incidence of the light beam.

40. The method of claim 38, wherein the detecting step further comprises:
    detecting light propagating from the polishing surface outside said region.

41. The method of claim 40, wherein the determining step comprises:
    comparing a ratio of voltages to a prescribed voltage ratio, wherein the ratio of voltages comprises the voltage corresponding to a first signal output in response to detecting light propagating through the region within approximately 5 degrees of the angle of incidence of the light beam and the voltage corresponding to a second signal output in response to detecting light propagating outside said region, and wherein the prescribed voltage ratio corresponds to a ratio of the voltages of the first and second signals output whenever the polishing surface of the polishing pad exhibits the desired roughness.

42. The method of claim 41, wherein the method is employed for performing a conditioning process on the polishing pad to produce a desired roughness on the polishing surface, the method further comprising the step of:

terminating the conditioning process whenever the ratio of voltages of the first and second signal output approximately equals the prescribed voltage ratio.

43. A method for determining the roughness of a polishing surface of a polishing pad, comprising the steps of:
 (a) producing a light beam which impinges the polishing surface of the polishing pad at a predetermined angle;
 (b) detecting at least a portion of the light reflected from the polishing surface of the polishing pad as a result of the impingement thereon by the light beam;
 (c) outputting an output signal representative of the light detected; and
 (d) determining the roughness of the polishing surface of the polishing pad from the output signal.

44. The method of claim 43, wherein the step of producing a light beam comprises:
 producing a light beam having as small a beam spot at the polishing surface as possible.

45. The method of claim 43, wherein the step of producing a light beam comprises:
 producing a light beam having a beam spot diameter at the polishing surface of less than 40 microns.

46. The method of claim 43, wherein the determining step comprises:
 comparing the output signal to a prescribed signal, said prescribed signal corresponding to a signal indicative of the polishing surface having a desired roughness.

47. The method of claim 46, wherein the polishing pad is in motion relative to the light beam, and wherein the comparing step comprises the steps of:
 (a) measuring a predetermined number of discrete voltage values of the output signal over a prescribed time period;
 (b) storing the voltage values to form an array;
 (c) calculating the mean of the array;
 (d) determining an average variation of the voltage values of the array from the mean of the array by dividing the summation of the absolute value of the difference between the mean of the array and each voltage value of the array by the predetermined number of values measured; and,
 (e) comparing the average variation to a prescribed variance, said prescribed variance corresponding to the average variation that is exhibited by the signal representative of the light detected whenever the polishing pad has the desired surface roughness.

48. The method of claim 47, wherein the method is employed for performing a conditioning process on the polishing pad to produce a desired roughness on the polishing surface, the method further comprising the step of:
 terminating the conditioning process whenever the average variation equals or exceeds the prescribed variance.

49. The method of claim 47, wherein the method is employed for performing a conditioning process on the polishing pad to produce a desired roughness on the polishing surface, said conditioning process including the translation of a conditioning head across the polishing surface of the pad, and said polishing surface of the pad comprising a plurality of grooves, and wherein:
 (a) the measuring step comprises measuring voltage values only when the light beam overlies a non-grooved portion of the polishing pad; and,
 (b) the prescribed period of time corresponds to one sweep of a conditioning head over the surface of the pad.

50. The method of claim 47, wherein the method is employed for performing a conditioning process on the polishing pad to produce a desired roughness on the polishing surface, said conditioning process including the translation of a conditioning head across the polishing surface of the pad, and wherein:
 the prescribed period of time corresponds to one sweep of a conditioning head over the surface of the pad.

51. A device for conditioning a polishing surface of a polishing pad, comprising:
 a conditioning head which translates over the surface the pad; and
 an apparatus for determining the roughness of the surface of the pad, the apparatus including:
  i) a light source for producing a light beam which impinges the surface of the pad at a predetermined angle,
  ii) a light detector for detecting at least a portion of the light scattered from the surface of the pad as a result of the impingement thereon by the light beam, said light detector including an output for outputting a signal representative of the light detected,
  iii) means for comparing the signal output by the light detector to a prescribed signal, said prescribed signal corresponding to a signal produced by the light detector when the polishing surface of the polishing pad exhibits a desired roughness, and
  iv) means for measuring a predetermined number of discrete voltage values of the signal output by the light detector over a prescribed time period which corresponds to one sweep of the conditioning head.

52. The device of claim 51 wherein the polishing surface of the pad includes a plurality of grooves, and the measuring means measures voltage values of the light detector signal only when the light beam impinges upon a non-grooved portion of the polishing pad.

53. A method of conditioning a surface of a polishing pad to produce a desired roughness, comprising the steps of:
 translating a conditioning head across the surface of the pad; and
 determining the roughness of the surface of the pad, the determining step including:
  i) producing a light beam which impinges the surface of the pad at a predetermined angle,
  ii) detecting at least a portion of the light scattered from the surface of the pad as a result of the impingement thereon by the light beam,
  iii) outputting a signal representative of the light detected, and
  iv) comparing the representative signal to a prescribed signal, said prescribed signal corresponding to a signal indicative of the polishing surface having a desired roughness, the comparing step including measuring a predetermined number of discrete voltage values of the representative signal over a prescribed time period which corresponds to one sweep of the conditioning head.

* * * * *